Oct. 12, 1943.  H. O. LINDGREN  2,331,556
PROCESS FOR PURIFYING WORT
Filed Aug. 5, 1941
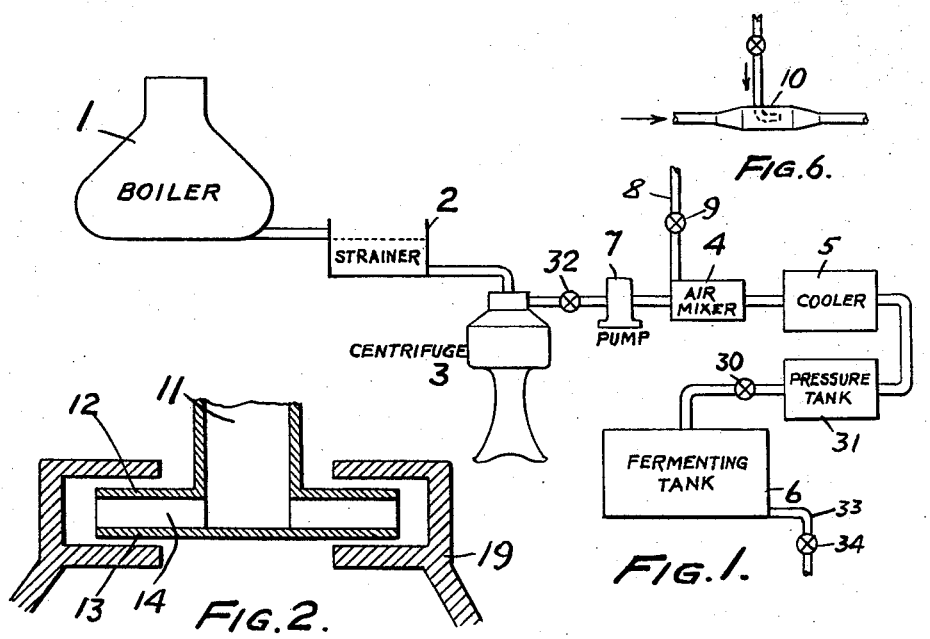
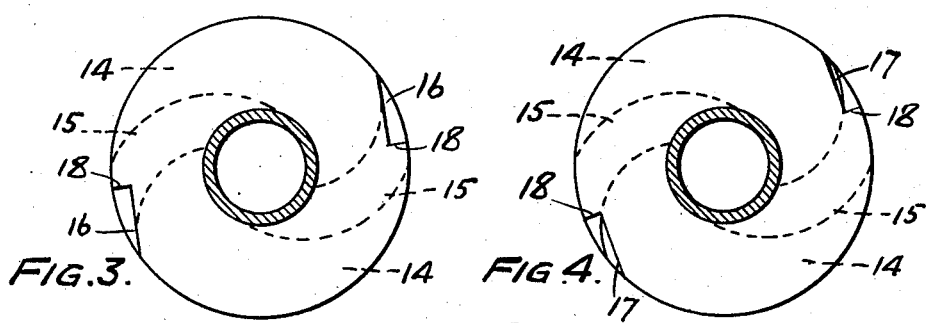
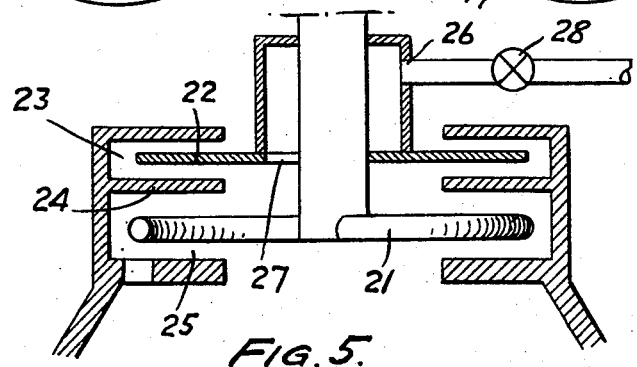
WITNESS:
INVENTOR
Hans Olof Lindgren
BY
Busser and Harding
ATTORNEYS.

Patented Oct. 12, 1943

2,331,556

UNITED STATES PATENT OFFICE 2,331,556

PROCESS FOR PURIFYING WORT

Hans Olof Lindgren, Appelviken, Sweden, assignor to The De Laval Separator Company, New York, N. Y., a corporation of New Jersey Application August 5, 1941, Serial No. 405,461
In Sweden October 19, 1940

1 Claim. (Cl. 99—52)

In making beer it has been customary to cool, purify, and aerate the wort in cooling vats, usually shallow tanks in which the wort is cooled by the surrounding cool air. On the bottom of the cooling vat the impurities contained in the warm wort, together with those impurities which precipitate during the cooling operation, are deposited. The first-mentioned impurities may be designated "hot sludge" and the other impurities "cool sludge." The major portion of the purified and cooled liquid may be drawn off. The impurities deposited on the bottom, together with a minor portion of the wort, are removed. Such minor portion of the wort is recovered by a filtering or centrifuging operation. During the cooling period the wort absorbs air, which is important with regard to the subsequent fermenting operation. The method described, however, is open to several objections. The cooling vat occupies considerable space. The cooling requires considerable time, during which the wort is in contact with the atmosphere. In order to avoid infection of the wort it is necessary for the air in the refrigerating room to be completely sterile. And, also, a sufficiently complete removal of the wort from the impurities necessitates a subsequent purifying operation.

The object of the invention is to provide a method of purifying, cooling, and aerating the wort, the main part of which is carried out as a continuous process, which is free of the above objections. The warm wort leaving the hops boiler, at a temperature which is usually above 85° C. (185° F.), and which should not be below 70° C. (158° F.), or above 100° C. (212° F.), is strained with a view to removing the coarsest impurities. It is then purified in a centrifuge from which the purified wort is discharged continuously. The wort is then passed through a cooler of such a construction that it cannot therein come into contact with the atmosphere. The cooled wort is conveyed to tanks, e. g., similar to the fermenting vats above described, in which the cool sludge is removed from the wort by finely divided air which has been mixed therewith at some step of the process at which the wort is hot enough to sterilize the air, and which in the tank 6 lifts the cool sludge to the surface. The air and the impurities, together with a small amount of wort, there form a layer of froth which may be skimmed off. If a suitable amount of air is used, a satisfactory purification is obtained at the same time, as the amount of wort contained in the froth is so small that it is unnecessary to take any measures for recovering it. The finely divided air need not be sterile unless it is introduced into the stream after the wort has been partly or wholly cooled.

The process is not dependent for its execution upon the employment of any specific apparatus, but the drawing, showing operative apparatus of different types, will aid in understanding the description of the process. Fig. 1 is a diagrammatic view of a complete installation for carrying out the process.

Fig. 2 is a vertical sectional view of one type of paring device that may be applied to the centrifuge. Figs. 3 and 4 are plan views of the bodies of the paring device of Fig. 2. Fig. 5 is a vertical sectional view of another type of paring device that may be applied to the centrifuge. Fig. 6 is a detail view of a modification for admitting and mixing air.

Referring first to Fig. 1: The warm wort comes from the boiler 1 and passes through the strainer 2 in which the coarsest impurities are removed. The wort is then passed through a centrifuge 3 to a cooler 5. The cooled wort is then conducted to the fermenting vat 6 in which the cool sludge is removed.

The warm wort, which has passed through the separator, has such a high temperature that any bacteria by which it may possibly have been contaminated are killed. It is therefore not necessary to keep the wort completely separated from the air in the centrifuge. It is thus possible to work with centrifugal separators of the more common type in which the liquid is discharged from the bowl through open outlets, and is collected in a collecting vessel. When using separators of this type it is necessary to arrange a pump 7 after the separator by which the wort can be conveyed through the cooler 5 into the fermenting vat, and aeration of the warm wort, additional to that incident to the passage of the liquid through a centrifugal machine of this type, may be effected by admitting air through pipe 8 into air mixer 4.

However, with separators of this type it may be difficult to regulate the amount of air added to the wort. For this reason it is advantageous to work with separators in which the amount of air mixed with the wort can be closely controlled, or with separators in which the wort leaving the machine is free from air. In using separators of the latter type, the inlets and outlets, through which, respectively, the wort is fed into the separators and discharged therefrom, make tight joints with the pipe lines by means of packing devices. In a separator of this type the liquid is pumped through the machine, thereby creating a pressure at the outlet of the separator that may be sufficiently high to enable the wort to be passed through the cooler. An accurately regulated amount of air is mixed with the wort between the separator and the cooler. This may be done by admitting air through pipe 8 into the air mixer 4, or by passing the wort through an ejector apparatus 10 into which the air is sucked and atomized in the wort, as shown in Fig. 6; or the ejector apparatus may be replaced by a pump 7, the capacity of which is so determined that the desired quantity of air is sucked into it together with the wort from the separator and is mixed with the wort. With both these arrangements it is possible to regulate the amount of air being mixed with the wort, for instance by means of a valve 9 in the air pipe 8.

In most cases it is preferable to use separators provided with a so-called paring device which projects into the liquid contained in the bowl. If the paring member is in the form of a disc of rotational symmetry in which channels are arranged, and if the disc projects sufficiently deep into the rotating layer of liquid, a liquid can be obtained which is completely free from air. The paring device is capable of discharging the liquid under so high a pressure that it can pass through an ejector 10 for admixture of air and thence through a cooler, without requiring a pump to create or supplement such pressure. If the paring disc does not project sufficiently deep into the rotating layer of liquid, a completely air-free liquid is not obtained, and it is therefore possible to regulate the amount of air mixed with the liquid contained in the bowl by changing the distance the paring disc projects into the liquid. On the other hand, the pressure under which the liquid leaves the paring device is also dependent on the said distance, and it is therefore not assured, if it is required to mix a considerable amount of air with the wort, that the pressure obtained will be sufficiently high to force the liquid through the cooler. It may therefore be necessary to arrange between the separator and the cooler a pump by which the mixture of wort and air may be passed from the separator through the cooler.

If it is elected to effect admixture of a large amount of air with the wort in a separator provided with a paring device, it is found possible to do so simultaneously with obtaining high pressure.

According to Figs. 2 and 3 (or Figs. 2 and 4) the paring member 11 is composed of two plane discs 12 and 13, between which conveyor bodies 14 are arranged, channels 15 being formed between the said bodies. One of the discs, or both, is provided with recesses (16 in Fig. 3, 17 in Fig. 4). If the recesses are so located that the edge 18 is close to the conveyor body, as shown in Fig. 3, large amounts of air are mixed with the liquid, but if they are placed as illustrated in Fig. 4, a considerably lesser amount of air is mixed with the liquid. By this means it is possible to regulate the separator for operation under different conditions. Experience has shown that the amount of air must be determined according to the variations in the content of extract of the wort. A thin wort should be more efficiently mixed with air than is necessary in the case of a thick wort. If desirable, the paring disc may be so constructed that the regulation referred to in the foregoing may be effected during operation.

Fig. 5 illustrates the use of a paring tube, the orifice of which is directed towards the rotating liquid. An arrangement of this type enables high pressure and strong and intimate mixing of air and liquid. In order to regulate the amount of air, the paring tube 21 is separated from the atmosphere by a disc 22, which projects into the rotating layer of liquid, advantageously in a chamber 23 which is separated from the chamber 25, in which the paring tube works, by means of a wall 24. The disc 22 is connected to a pipe 26 which communicates with the atmosphere. Through the pipe line air is sucked through the opening 27 and the chamber 25 into the paring tube 21. By means of a valve 28 in the pipe line 26 the admission of air to the chamber 25, and thus also to the wort, may be regulated.

The cool sludge does not precipitate instantaneously and part of it will therefore be precipitated in the fermenting vat. In order that such part of the sludge shall be brought to the surface of the liquid, air must also be liberated in the fermenting vat. When the liquid passes through the cooler, air is dissolved. The dissolved air is liberated in the fermenting vat.

The quantity of air dissolved by the wort can also be regulated within certain limits. The dissolving ability of wort with regard to air is increased with increasing pressure and falling temperature. For this reason it may be advantageous to provide, beyond the cooler, a throttle 30 by which the pressure in the cooler is increased. This throttle or valve should advantageously be such that the back-pressure is constant, independent of the quantity of liquid passing through the system. To increase the amount of dissolved air, it may be advantageous to arrange a closed tank 31 beyond the cooler, through which tank the wort passes and in which a suitable pressure is maintained, the wort thereby dissolving more air. In order that the separator shall work under constant conditions, it may be advantageous to arrange beyond the separator a valve (e. g., valve 32, Fig. 1), such valve maintaining a constant back-pressure in the discharge pipe of the separator independent of the quantity of wort passing therethrough.

It may be desirable to keep the wort under pressure during the time required for fermentation to take place. This can be readily effected by providing a throttle valve 34 in the outlet 33 from the fermentation tank 6.

Instead of using a separator provided with a paring device projecting into the wort, it may also be advantageous to use a separator the outlet of which is provided with a centrifugal pump which forces the wort into a stationary spiral housing. An example of such a pump is shown in U. S. Patent No. 2,107,035, issued February 1, 1938.

While in my improved process the air in the enclosure containing the fermentation tank need not be sterile in order to avoid infection of the wort, it is desirable that it should be sterile, that is, that during fermentation, as well as during cooling, there should be no substantial contact of the wort with free air.

What I claim and desire to protect by Letters Patent is:

In the manufacture of beer, the method of purifying wort which comprises establishing a flowing stream of wort, and, in the course of its flow, effecting by centrifugal force the removal of the heavier impurities, establishing a superatmospheric pressure in the flowing stream, admitting air to the flowing stream while such stream is at a bacteria-killing temperature, cooling the flowing stream to thereby dissolve the air, and conveying the cooled air-impregnated flowing stream to a locus of fermentation wherein fine air bubbles rise to the top and carry with them the remaining lighter impurities to thereby form impure froth containing little wort, and separating the frothy layer to thereby leave a bacteria-free wort requiring no further purification.

HANS OLOF LINDGREN.